US009986285B2

(12) United States Patent
Harper et al.

(10) Patent No.: US 9,986,285 B2
(45) Date of Patent: May 29, 2018

(54) SET FUTURE VIDEO RECORDINGS FROM AUDIOVISUAL CONTENT

(71) Applicant: DISH Technologies L.L.C., Englewood, CO (US)

(72) Inventors: Leslie Ann Harper, Highlands Ranch, CO (US); Kate Megan Carney Landow, Denver, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days. days.

(21) Appl. No.: 14/956,054

(22) Filed: Dec. 1, 2015

(65) Prior Publication Data

US 2017/0155948 A1 Jun. 1, 2017

(51) Int. Cl.
*H04N 21/433* (2011.01)
*H04N 21/472* (2011.01)
*H04N 21/435* (2011.01)
*H04N 21/482* (2011.01)
*H04N 21/439* (2011.01)
*H04N 21/475* (2011.01)

(52) U.S. Cl.
CPC ....... *H04N 21/4334* (2013.01); *H04N 21/435* (2013.01); *H04N 21/4394* (2013.01); *H04N 21/4758* (2013.01); *H04N 21/47214* (2013.01); *H04N 21/482* (2013.01)

(58) Field of Classification Search
CPC ..................... H04N 21/4334; H04N 21/4126
USPC .............. 386/248, 296; 725/39, 40, 53, 132; 60/248, 296
See application file for complete search history.

(56) References Cited

U.S. PATENT DOCUMENTS

| 6,874,160 | B1 * | 3/2005 | Herz ....................... H04N 5/445 348/E5.007 |
| 7,159,232 | B1 * | 1/2007 | Blackketter ........ H04N 5/44513 348/E5.102 |
| 8,468,453 | B2 | 6/2013 | Harper et al. |
| 8,699,855 | B2 | 4/2014 | Harper et al. |
| 9,210,368 | B2 * | 12/2015 | Stone ..................... H04N 5/782 |
| 9,258,614 | B2 * | 2/2016 | Shoykhet .......... H04N 21/47214 |
| 2002/0161579 | A1 * | 10/2002 | Saindon ................ G06F 17/289 704/235 |
| 2005/0196136 | A1 | 9/2005 | Blackketter et al. |
| 2005/0196139 | A1 * | 9/2005 | Blackketter ........ H04N 5/44513 386/296 |

(Continued)

OTHER PUBLICATIONS

Wikipedia, "Globally unique identifier," retrieved Aug. 19, 2015 from https://en.wikipedia.org/wiki/Globally_Unique_Identifier, 7 pgs.

(Continued)

*Primary Examiner* — Mishawn Hunter
(74) *Attorney, Agent, or Firm* — Seed IP Law Group LLP

(57) ABSTRACT

Embodiments are directed towards analyzing content, such as Timed Text data that separately accompanies program content, to detect a future program. When a future program is detected in the content, a tag or other data structure is generated with identifying information for the future program. The tag is stored and later used to schedule a recording for the future program. An electronic program guide may be analyzed based on the identifying information in the tag to determine if the future program has been added to the electronic program guide.

17 Claims, 8 Drawing Sheets

(56) References Cited

U.S. PATENT DOCUMENTS

| | | | |
|---|---|---|---|
| 2006/0026647 A1* | 2/2006 | Potrebic | H04N 5/44582 725/53 |
| 2008/0235259 A1* | 9/2008 | Abernethy, Jr. | G06F 17/30017 |
| 2009/0106792 A1* | 4/2009 | Kan | H04N 7/17318 725/34 |
| 2009/0185074 A1* | 7/2009 | Streijl | H04N 7/0885 348/468 |
| 2009/0271817 A1 | 10/2009 | White et al. | |
| 2009/0293098 A1* | 11/2009 | Pirani | H04N 7/17318 725/132 |
| 2010/0161716 A1 | 6/2010 | Kajos et al. | |
| 2010/0329644 A1* | 12/2010 | Rosenfeld | H04N 5/44543 386/297 |
| 2011/0191798 A1* | 8/2011 | Bassali | H04N 7/10 725/32 |
| 2011/0296456 A1 | 12/2011 | Pandala | |
| 2011/0320627 A1 | 12/2011 | Landow et al. | |
| 2012/0042647 A1 | 2/2012 | Vollert et al. | |
| 2012/0063744 A1* | 3/2012 | Weintraub | G11B 27/034 386/248 |
| 2012/0213494 A1* | 8/2012 | Barton | G11B 27/034 386/248 |
| 2012/0260290 A1* | 10/2012 | Friedlander | H04N 21/4314 725/44 |
| 2012/0296745 A1 | 11/2012 | Harper et al. | |
| 2014/0040955 A1 | 2/2014 | McKissick et al. | |
| 2014/0189742 A1* | 7/2014 | Hyoung | H04N 21/42204 725/44 |
| 2014/0317654 A1 | 10/2014 | Abed | |
| 2016/0037204 A1* | 2/2016 | McSweeney | H04N 21/4263 725/39 |
| 2016/0037227 A1* | 2/2016 | Benn | H04N 21/4828 725/53 |
| 2016/0088359 A1* | 3/2016 | Vaidhyanathan | H04N 21/4882 725/40 |

OTHER PUBLICATIONS

SMPTE Standard, Timed Text Format (SMPTE-TT), SMPTE ST 2052-1:2010, Dec. 3, 2010, 19 pgs.

Wikipedia, "Globally unique identifier," retrieved Aug. 19, 2019 from https://en.wikipedia.org/wiki/Globally_Unique_Identifier, 7 pgs.

Office Action, dated Sep. 8, 2017, for U.S. Appl. No. 14/956,057, Harper et al., "Recommend Future Video Recordings for Users From Audiovisual Content," 24 pages.

Office Action, dated Mar. 23, 2017, for U.S. Appl. No. 14/956,057, Harper et al., "Recommend Future Video Recordings for Users From Audiovisual Content," 20 pages.

* cited by examiner

SET FUTURE VIDEO RECORDINGS FROM AUDIOVISUAL CONTENT

BACKGROUND

Technical Field

The present disclosure relates generally to recording audiovisual content for a user, and more particularly, but not exclusively, to utilizing future program information in a current program to schedule a recording for a future program.

Description of the Related Art

Over the past few years, set-top boxes have greatly improved the television viewing experience for users. This improvement largely comes from the number of channels that are available to watch, the number programs that can be simultaneously recorded or watched, and the storage capacity of the set-top box. However, when it comes to recording shows or programs, users are typically limited to recording programs that are listed in an electronic program guide or setting up series recordings. To utilize these recording mechanisms users often have search for the particular show they want to record in the hopes that it is in the electronic program guide. If the program is not yet in the guide, then the user may be unable to schedule the recording. It is with respect to these and other considerations that the embodiments herein have been made.

BRIEF SUMMARY

Briefly stated, embodiments are directed towards analyzing content, such as Timed Text data that accompanies program content, to detect a future program. A tag is generated for the future program and stored for use in later scheduling a recording for the future program.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, the drawings include.

DETAILED DESCRIPTION

Figure 1:
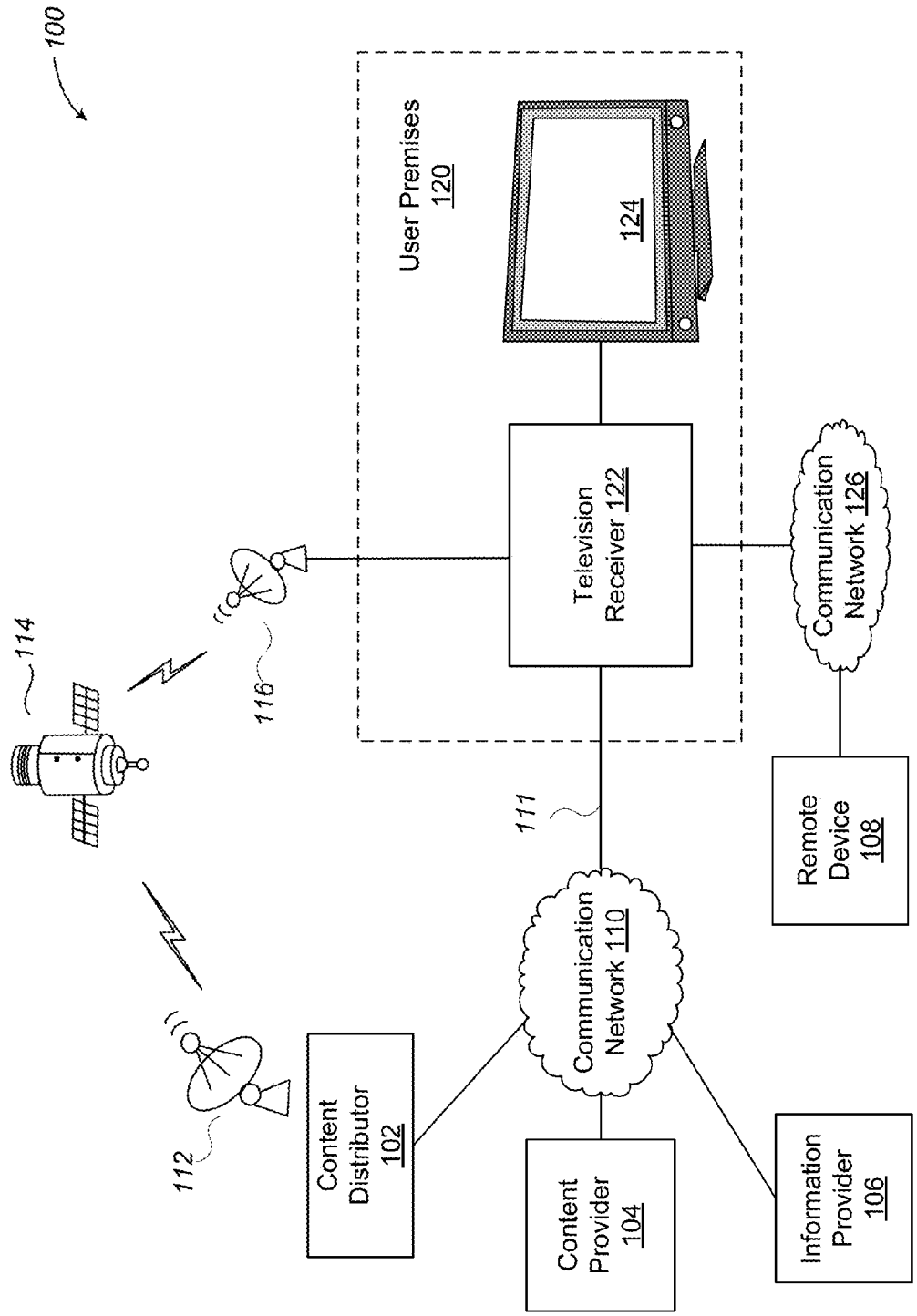
FIG. 1 illustrates a context diagram for providing audiovisual content to a user in accordance with embodiments described herein.

FIG. 1 shows a context diagram of one embodiment for providing audiovisual content to a user in accordance with embodiments described herein. Example 100 includes content provider 104, information provider 106, content distributor 102, communication networks 110, and user premises 120.

Typically, content providers 104 generate, aggregate, and/or otherwise provide audiovisual content that is provided to one or more users. Sometimes, content providers are referred to as "channels." Examples, of content providers 104 may include, but are not limited to, film studios; television studios; network broadcasting companies; independent content producers, such as AMC, HBO, Showtime, or the like; or other entities that provide content for user consumption. A content provider may also include individuals that capture personal or home videos and distribute these videos to others over various online media-sharing websites or other distribution mechanisms. The content provided by content providers 104 may be referred to as the program content, which may include movies, sitcoms, reality shows, talk shows, game shows, documentaries, infomercials, news programs, sports programs, or the like. In this context, program content may also include commercials or other television advertisements. It should be noted that the commercials may be added to the program content by the content providers 104 or the content distributor 102.

Information provider 106 may create and distribute data or other information that describes or supports audiovisual content. Generally, this data is related to the program content provided by content provider 104. For example, this data may include, for example, metadata, program name, closed-caption authoring and placement within the program content, timeslot data, pay-per-view and related data, or other information that is associated with the program content. In some embodiments, a content distributor 102 may combine or otherwise associate the data from information provider 106 and the program content from content provider 104, which may be referred to as the distributed content or more generally as content. However, other entities may also combine or otherwise associate the program content and other data together.

In various embodiments, content providers 104 or information provider 106, or other entities, may add various additional information to the audiovisual content prior to its distribution to users. This additional information may include inserting or otherwise encapsulating metadata into the program content data stream of the content, generating a Timed Text data stream that is separate from the program-content data stream, etc. This resulting content can include the program content, metadata, Timed Text data, or other information.

Content distributor 102 may provide the content, whether obtained from content provider 104 and/or the data from information provider 106, to a user through a variety of different distribution mechanisms. For example, in some embodiments, content distributor 102 may provide the content and data to a user's television receiver 122 directly through communication network 110 on link 111. In other embodiments, the content may be sent through uplink 112, which goes to satellite 114 and back to downlink station 116 that may also include a head end (not shown). The content is then sent to an individual television receiver 122 of a user/customer at user premises 120.

Communication network 110 may be configured to couple various computing devices to transmit content/data from one or more devices to one or more other devices. For example, communication network 110 may be the Internet, X.25 networks, or a series of smaller or private connected networks that carry the content. Communication network 110 may include one or more wired or wireless networks.

Television receiver 122 may be a receiving device of the content from content distributor 102. Examples of television receiver 122 may include, but are not limited to, a set-top box, a cable connection box, a computer, or other content or television receivers. Television receiver 122 may be configured to demultiplex the content and provide the program content or other information to a user's display device 124, such as a television, monitor, or other display device.

Although FIG. 1 illustrates the television receiver 122 providing content for display on a display device 124 located on the user premises 120, embodiments are not so limited. In some other embodiments, the television receiver 122 provides the content to a user's mobile device (not illustrated), such as a smartphone, tablet, or other computing device, that is at a remote location to the user premises 120.

Television receiver 122 analyzes the content, such as the Timed Text data stream, for one or more future programs to schedule a recording for the future programs, as described herein. The television receiver 122 may automatically set a schedule to record a future program when detected in the content. In other embodiments, the user may select to schedule the future program, such as by clicking a button on a remote control within a period of time after the future program is detected, providing a notification or guide to the user where the user can modify the recording settings, etc. In yet other embodiments, the television receiver 122 may automatically set a reminder for the future program such that a notification is provided to the user at or before the airing of the future program.

In various embodiments, the television receiver 122 may send, via communication network 126, a message to a remote device 108 of the user indicating that the existence of a future program has been detected in the content. The remote device 108 displays details of the future program to the user, from which the user can modify recording settings and select to schedule a recording for the future program. Or the user can disregard the future program notice because they are uninterested in recording the future program. The remote device 108 returns another message to the television receiver 122 with an indication to record the future program, which may include one or more recording settings or modified settings, or to disregard the future program. Remote device 108 is a user computing device, and may be a mobile phone or smartphone, a tablet computer, a laptop computer, a desktop computer, a television remote control, smartwatch, or other computing device of the user.

Communication network 126 may be configured to couple various computing devices to transmit data or content from one or more devices to one or more other devices, such as television receiver 122 sending notifications of a future program to remote device 108 and receiving recording instructions back from the remote device 108. In some embodiments, communication network 126 may be included in communication network 110. And in other embodiments, communication network 126 may be separate and/or distinct from communication network 110, and the networks may or may not have any direct communications between them. For example, communication network 110 may be the internet, and communication network 126 may be a personal area network via Bluetooth technology.

Figure 2:
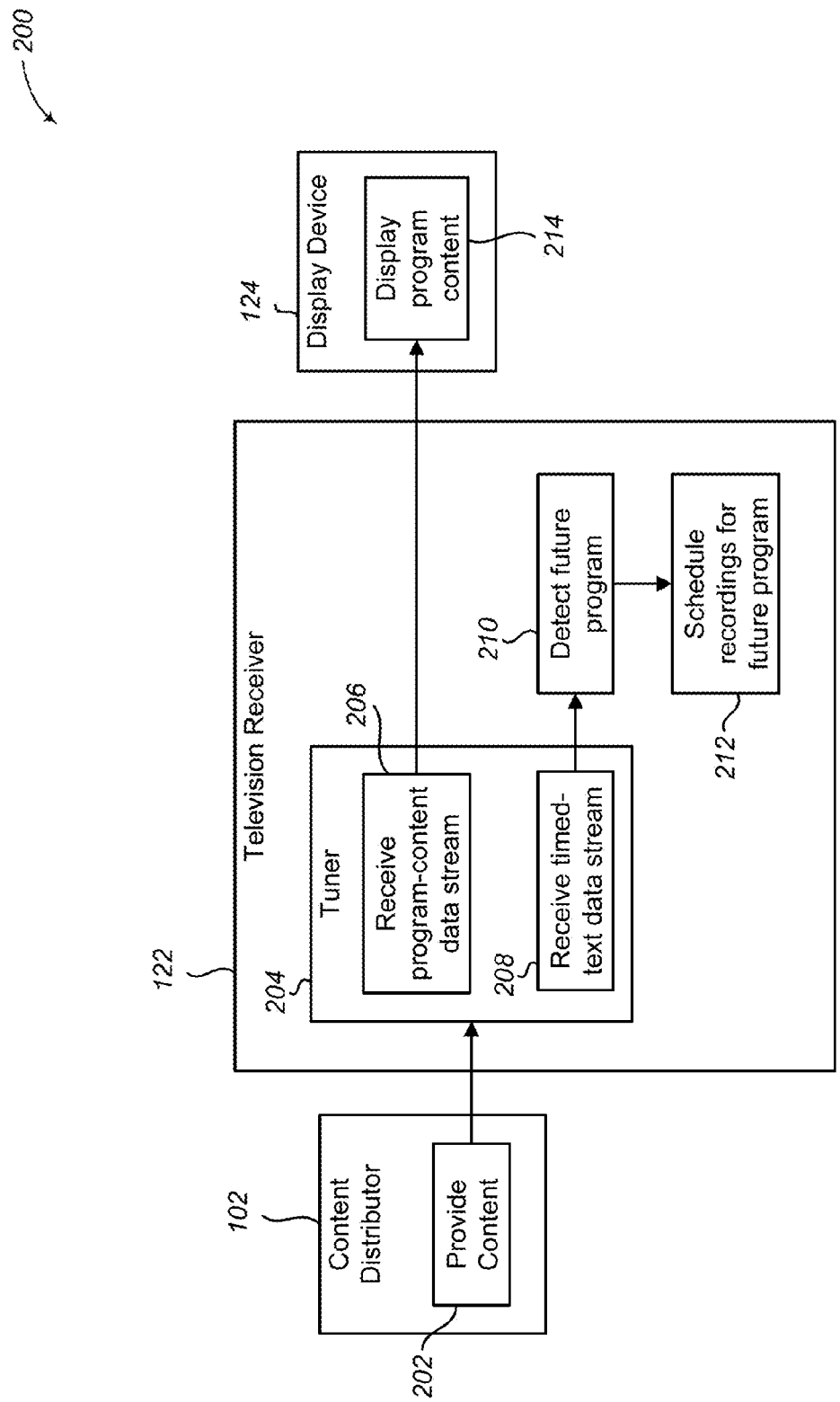
FIG. 2 is a diagram of one non-limiting embodiment of a system for displaying program content and scheduling future recordings in accordance with embodiments described herein.

FIG. 2 is a diagram of one non-limiting embodiment of a system for displaying program content and scheduling future recordings in accordance with embodiments described herein. System 200 includes content distributor 102, television receiver 122, and display device 124.

The content distributor 102 provides content 202 to the television receiver 122, where it is received by tuner 204 of the television receiver 122. It should be noted that the content may also be provided by some other entity that is not illustrated. In this example, the content includes two separate data streams being received by the tuner 204, a program-content data stream 206 and a Timed Text data stream 208. The program-content data stream and the Timed Text data stream are synchronized such that the Timed Text data in the Timed Text data stream corresponds to the program content in the program-content data stream. The program-content data stream and the Timed Text data stream may be received simultaneously or may be received separately and re-synchronized by the television receiver 122.

The television receiver 122 provides the program content from the program-content data stream to the display device 124, where the display device 124 displays program content 214.

As the content is being received by the television receiver 122 and the program content is being provided to the display device 124, the television receiver 122 also analyzes the Timed Text data in the Timed Text data stream to detect an indication of future programs 210. The Timed Text data may include various different types of information that can be used to identify a future program to be received. In some embodiments, the Timed Text data may include a unique program identifier of a future program, such as a global unique identifier, a Tribune or Gracenote identifier, or other content identifier used by a content provider or content distributor. In other embodiments, the Timed Text data may include recording parameters, such as a time, date, and channel of the future program, or it may include other programming information that can identify the future program. However, embodiments are not so limited and other information may identify a future program, such as name or title of the program, a combination of actors' names, a category or sub-category of the future program, or the like, or some combination of attributes thereof.

As mentioned above, the program-content data stream and the Timed Text data stream are synchronized. In this way, the identifying information of a future program is placed in the Timed Text data stream so that it corresponds to some aspect of the program content that references the future program. For example, the identifying information for a future program may be in the Timed Text data stream while a commercial for the future program is being shown in the program content. In another example, the identifying information may correspond to spoken words by commentators, actors, etc. For example, during a baseball game program in late July, the commentators may talk about a new show coming in September. The identifying information for the new show is included in the Timed Text data while the new show is being discussed.

In various embodiments, the identifying information may be removed from the Timed Text data when the reference in the program content ends, such as, for example, when the commercial ends or when the commentators stop talking about the new show. In other embodiments, the identifying information may be included in the Timed Text data for a given amount of time after the reference to the future program ends or for a given amount of time independent of how long the future program is being referenced in the program content. For example, the identifying information may be in the Timed Text data for 35 seconds after it is initially discussed or shown in the program content.

Although FIG. 2 describes using identifying information in the Timed Text data stream, embodiments are not so limited and other types of data accompanying the content may be analyzed for the identifying information of a future program. The other types of data that also may be analyzed include, metadata encapsulated with the program content; closed caption data, such as by scraping the closed-caption data for program information; video processing, such as character recognition techniques to identify the future program's information when displayed; audio processing, such as voice recognition techniques to detect and identify the future program's information when audibly discussed; etc.

When the existence of a future program is detected, the television receiver 122 schedules a recording for the future program 212. The television receiver generates a tag, cookie, token, or other data structure that stores information to identify the future program. This information may include programing parameters to record the future program when it is received or an identifier to query an electronic program guide or other non-linear content provider information for the future program.

As described herein, the future program may be one that is weeks, months, or even years out and is not in a current electronic program guide. The tag is a placeholder that is used periodically to check the electronic program guide to see if the guide has been updated to include the future program. In some embodiments, the tag includes a unique identifier or other identifying information, which is used to locate a listing of the future program in the electronic program guide.

When the future program is identified in the electronic program guide, a recording for the future program is scheduled and the future program is recorded when received by the television receiver. In other embodiments, the tag may include information that tells the television receiver when, what channel, and how long to record the future program without the use of finding the future program in the electronic program guide. In this way, the television receiver would still record the future program, even if the future program is not added to the electronic program guide, or the electronic program guide is unavailable.

In other embodiments, the information stored in the tag for the future program may identify one or more non-linear content providers where the future program may be obtained. The tag is utilized to query non-linear content provider information for the future program, which may be currently available from the non-linear content provider or may be available at a date in the future. When the future program is identified in the non-linear content provider information, the future program is requested if currently available, or a recording for the future program is scheduled and the future program is requested and recorded when available. In this way, the user can access and view non-linear content when it is advertised or as soon as it is available after it is advertised.

The operation of certain aspects will now be described with respect to FIGS. 3-5. In at least one of various embodiments, processes 300, 400, 500, and 600 described in conjunction with FIGS. 3-6, respectively, may be implemented by or executed on one or more computing devices, such as television receiver 122 in FIG. 1.

Figure 3:
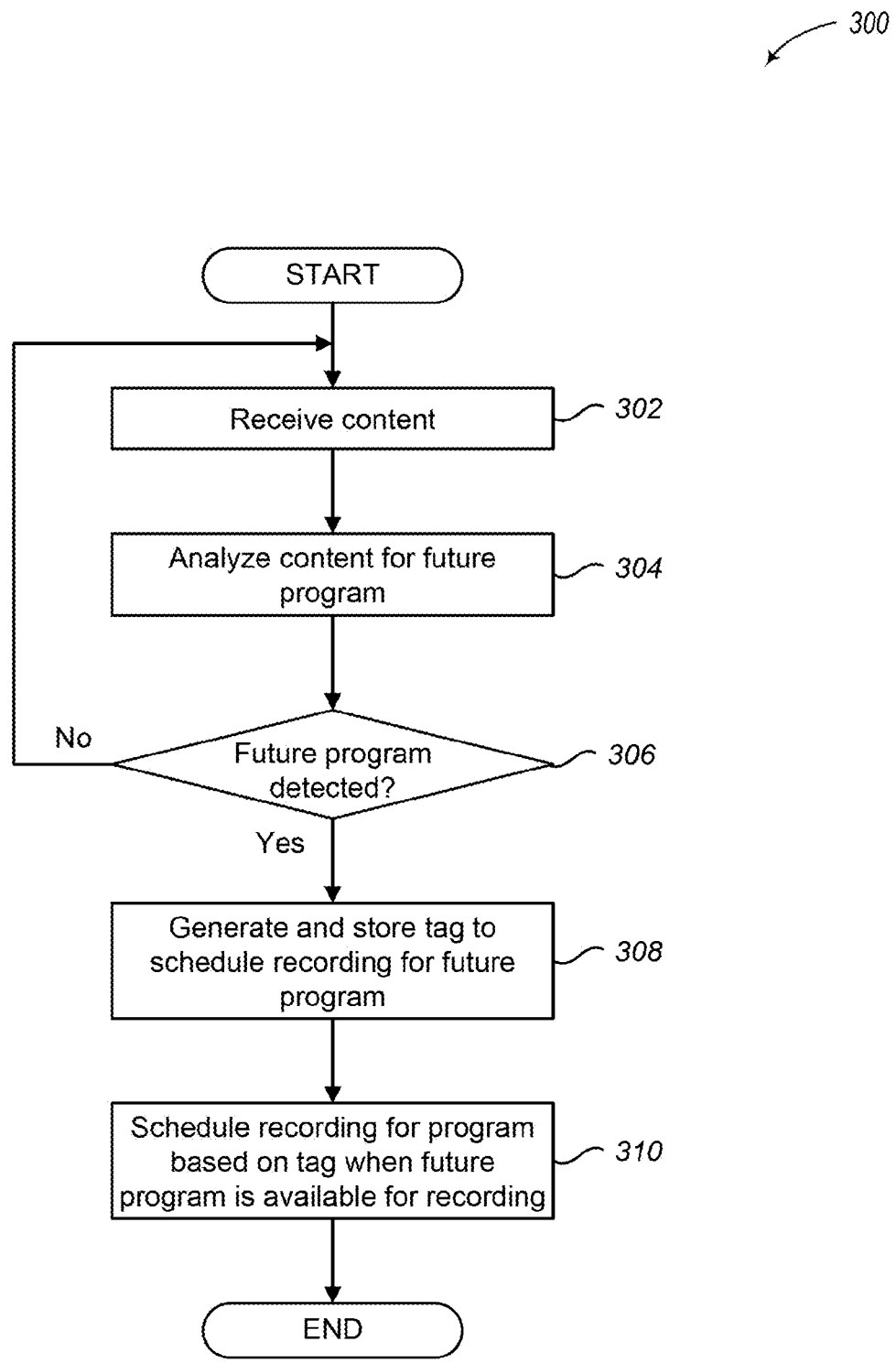
FIG. 3 illustrates a logical flow diagram generally showing one embodiment of an overview process for analyzing content to detect a future program and scheduling a recording for the future program in accordance with embodiments described herein.

FIG. 3 illustrates a logical flow diagram generally showing one embodiment of an overview process for analyzing content to detect a future program and scheduling a recording for the future program.

Process 300 begins, after a start block, at block 302, where content is received by a television receiver. As mentioned above, the content may include program content, Timed Text data, metadata inserted in the program content, closed-captioning data, etc.

Process 300 proceeds to block 304, where the content is analyzed for future programs. In various embodiments, the Timed Text data is examined for identifying information of a future program. As described herein, the identifying information may be a unique identifier of the future program, recording parameters, name or title of the future program, a combination of actors' names, a category or sub-category of the future program, or the like, or some combination thereof. Not all received audiovisual programs will have Timed Text data, and other components or elements of the content may also be analyzed for the identifying information of a future program. For example, the identifying information may be extracted from metadata embedded with the program content; extracted from or observed in the program content using audio or video character recognition techniques, scrapped from closed-captioning data associated with the program content, etc.

Process 300 continues at decision block 306, where a determination is made whether a future program is detected in the analyzed content. In various embodiments, the future program is detected when sufficient identifying information is obtained or extracted from the content. The identifying information is sufficient when it includes a unique identifier for the future program, other information that in combination establishes an identity of the future program, or the recording parameters of the future program.

In some embodiments, the content may not include sufficient information at that point to record the future program. For example, the content may identify the program name, but not the channel, date, or time. In some embodiments, the system stores the partial, non-sufficient future program information for some timeframe to try and acquire additional information about the future program. In such an embodiment, process 300 may continuously receive additional content from one or more channels and analyze the additional content for additional information for that future program, which when combined with the previously obtained partial information is sufficient to identify the future program. In some embodiments, very basic information, such as the program title, may be sufficient information if the television receiver can use the information, at block 310, to search the electronic program guide for programs with that title.

If a future program is detected, process 300 flows to block 308; otherwise, process 300 loops to block 302 to continue to receive additional content.

At block 308, a tag or other data structure is generated and stored to schedule a recording for the detected future program. In various embodiments, the tag includes the identifying information for the future program. For example, a tag is generated to include a future program's unique identifier that was extracted from the Timed Text data of the content. In another example, the tag includes a time, date, channel, and duration to record the future program. In some embodiments, these recording parameters may be obtained from the analysis of the content. In other embodiments, the television receiver accesses a database that maintains the recording parameters for each of a plurality of different programs. In this example, the unique identifier is used to query the database for the recording parameters, and the recording parameters are stored in the tag.

Process 300 continues next at block 310, where a recording for the future program is scheduled based on the stored tag. In various embodiments, the information included in the tag is used to query an electronic program guide to determine if a listing for the future program has been added to the electronic program guide. This query may be at predetermined periodic time intervals, such as at a same time each day, or it may be performed when the electronic program guide is updated, such as every time additional programs are added to the guide. When the future program is listed in the electronic program guide, a recording is scheduled and the future program is recorded when it is received by the television receiver. In yet other embodiments, the future program may be recorded based on the identifying information in the tag without looking up the future program in the electronic program guide. Additional example embodiments of recording the future program from an electronic program guide based on the stored tag are described in more detail below in conjunction with FIG. 5.

In other embodiments, the information included in the tag is used to query other content delivery mechanisms to determine if the future program is currently available or will become available. These other content delivery mechanisms may include linear or non-linear content providers. Linear content providers may include anytime or appointment content providers. And non-linear content providers include video-on-demand, pay-per-view, internet websites, or other content providers that provide content when requested by the user. When the future program is available from the other content providers, the future program may be requested and received from the provider or a recording may be scheduled for the future program with it becomes available. Additional example embodiments of obtaining the future program from a non-linear content provider based on the stored tag are described in more detail below in conjunction with FIG. 6.

In yet other embodiments, the future program may not be recorded, but a reminder notification may be provided to the user on display device 124 or remote device 108. This notification lets the user know that a previously detected future program is about to air or is now available for viewing. In some embodiments, the notification may include a link, pointer, or other mechanism for the user to quickly access the future program. For example, the television receiver may provide a notification to the user via an application executing on the user's smartphone. The notification may include a "watch now" button or a "record" button. By activating the "watch now" button, the smartphone sends a message to the television receiver to being playing the future program, whether by changing to the appropriate channel or obtaining the future program from an on-demand provider or other non-linear content provider. Similarly, by activating the "record now" button, the smartphone sends a message to the television receiver to being recording the future program or scheduling a recording to occur when the future program airs. Other types of notifications may also be provided to the user based on the tag for the detected future program.

After block 310, process 300 terminates or returns to a calling process to perform other actions.

It should be noted that blocks 302, 304, 306, and 308 may be continuously performed as the content is received and future programs are detected in the content. In some embodiments, block 310 may be performed as the content is received or asynchronous to the receipt of the content, such that it is performed at a later date after the content is received and processed.

In other embodiments, process 300 may be implemented by a server of the content distributor 102, rather than on an individual television receivers 122, which is described in more detail below in conjunction with FIG. 7. Briefly, however, the content distributor 102 may obtain user-defined preferences for a plurality of users or may determine viewing preferences of users based on viewing histories. The content distributor 102 can analyze content provided by content providers 104 or additional data provided by information providers 106, as described herein, to detect future programs. Based on the user preferences, the content distributor 102 can notify the user of the future program. If the user is interested in the future program, the content distributor 102 generates a tag for the detected future program and provides it to the television receiver of the user who is interested in the future program. Each corresponding television receiver can store the tag and then schedule the recording for the future program based on the tag, as described elsewhere herein.

In this way, the content distributer 102 can predict which users will like to record which future programs, and the user's television receiver does not need to use its own tuners to look for the future programs. Similarly, the content distributor can analyze each channel for future content, whereas the television receiver is limited to the number of tuners it has available and to the channels that the user is watching or selected for monitoring.

Figure 4:
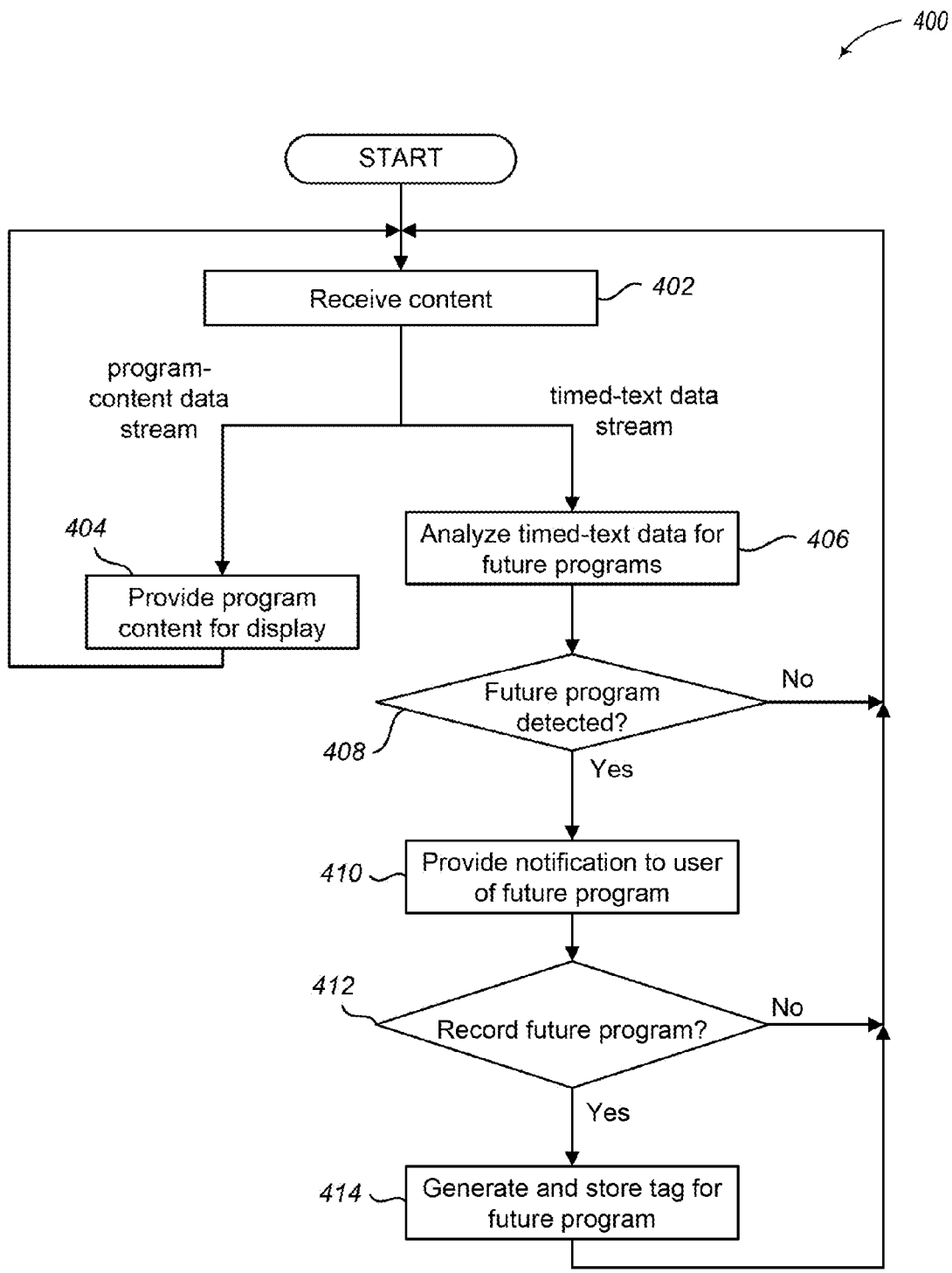
FIG. 4 illustrates a logical flow diagram generally showing one embodiment of a process for analyzing content and detecting a future program in accordance with embodiments described herein.

FIG. 4 illustrates a logical flow diagram generally showing one embodiment of a process for analyzing content and detecting a future program in accordance with embodiments described herein.

Process 400 begins, after a start block, at block 402, where the content is received. In various embodiments, block 402 employs embodiments of block 302 of FIG. 3 to receive content. As described elsewhere herein, the content may include a program-content data stream and a Timed Text data stream.

Process 400 proceeds from block 402 to block 404 for the program-content data stream. At block 404, program content is obtained from the program-content data stream and provided to a display device for display to a user. After block 404, process 400 loops to block 402 to receive additional content, such as a next packet, next frame, next block of the program-content data stream, etc.

As the program content is provided to the display device, process 400 proceeds from block 402 to block 406 for the Timed Text data stream. At block 406, the Timed Text data in the Timed Text data stream is analyzed for future programs. In various embodiments, the Timed Text data may be scraped for identifying information of a future program, as described above in conjunction with block 304 in FIG. 3. As described elsewhere herein, other components or elements of the content may also be analyzed for future programs.

Process 400 proceeds to decision block 408, where a determination is made whether a future program is detected in the Timed Text data. In various embodiments, decision block 408 may employ embodiments of decision block 306 of FIG. 3 to determine if a future program is detected. If a future program is detected, process 400 proceeds to block 410; otherwise, process 400 returns to block 402 to continue to receive additional content, e.g., next packet, next frame, next block of the program-content data stream, etc.

At block 410, a notification is provided to the user of the future program. In some embodiments, the notification may be displayed on the same display device that is displaying the program content at block 404, such as display device 124 in FIG. 1. In other embodiments, the notification may be provided to a mobile device of the user, such as remote device 108 in FIG. 1. In some embodiments, the mobile device may display notifications for one or a plurality of detected future programs to the user. The notification may identify the future program, such as a title, date, time, channel, or other information about the future program. In some embodiments, block 410 may be optional and may not be performed, which may be selected by the user through pre-defined user preferences.

In some embodiments, a plurality of detected future programs may be stored and provided to the user when requested. For example, as the content stream is being analyzed, and future programs are detected at block 406, a list of suggested future recordings is stored and maintained by the television receiver. The user can then access this list by opening a "suggested recordings" screen on the television or their mobile device. From this list, the user can select which of the future programs to record, delete future programs that they are not interested in, or do nothing such that they are deleted or selected to record after a predetermined amount of time depending on user preferences.

Process 400 continues at decision block 412, where a determination is made whether the future program is to be recorded. In some embodiments, the future program is automatically set to be recorded. In other embodiments, the future program is set to be recorded if it satisfies user-defined preferences. For example, user preferences may indicate that only baseball-themed movies are to be automatically recorded. If the future program is a movie about baseball, then it is set to be recorded; otherwise, the future program is not set to be recorded. In some embodiments, categories, sub-categories, actors, directors, years, or other attributes of the future program may be used to determine if the future program satisfies the user-defined preferences.

In some other embodiments, a user may be given a predetermined amount of time to acknowledge the future program and provide an indication to proceed with scheduling the recording. For example, the system may temporarily store the identifying information for the future program for a predetermined amount of time. If no indication to record the future program is received within the predetermined amount of time, then the identifying information for the future program is discarded. The predetermined amount of time may be until a corresponding commercial ends; until the future program is no longer being discussed or shown in the program content; for a pre-set time, for example, one minute; for a pre-set time after the commercial ends or the future program is no longer being discussed or shown in the program content; or some other time determined by the user.

In at least one embodiment, the user may utilize a remote control to provide an indication to the television receiver that the user acknowledges the future program and that the future program is to be recorded. In one non-limiting example, assume a commercial is showing for Program_A, which is not currently in the electronic program guide. The Timed Text data may include a unique identifier for Program_A while the commercial is airing. The unique identifier is extracted from the Timed Text data and temporarily stored. If the user clicks twice on a record button on the remote control while the commercial is still airing, then the future program is to be recorded, otherwise, the stored unique identifier for Program_A is deleted.

In another embodiment, the user may utilize a mobile device, such as a smart phone or tablet, to provide a message or other notification to the television receiver indicating that the future program is to be recorded. For example, the user may utilize an application executing on the mobile device to view future programs detected by the television receiver, where notifications of the future programs are provided to the mobile device at block 410. In this example, the application may display notifications for a plurality of future programs for the predetermined amount of time or until a user deletes the notifications. The user can click on a button in the application, and the mobile device sends another notification back to the television receiver to record or disregard one or more of the future programs.

In some embodiments, the user also may be enabled to modify one or more recording parameters of the future program. These modifications may be provided through the mobile device of the user or by the user manipulating a user interface on the display device displaying the program content. In one non-limiting example, the user can select to start the recording of the future program two minutes early and end the recording two minutes late. Any changes in the recording parameters may be stored in the tag at block 414, such that when the future program is added to the electronic program guide, the recording can be appropriately scheduled and recorded based on the modified recording parameters.

It should be noted that the way in which the user provides an indication to record the future program, how long the user has to provide the indication, etc. may be selected by the user through pre-defined user preferences.

If the detected future program is to be recorded, then process 400 proceeds to block 414; otherwise, process 400 loops to block 402.

At block 414, a tag to schedule the recording of the future program is generated and stored. In various embodiments, block 414 employs embodiments of block 308 in FIG. 3 to generate and store the tag.

After block 414, process 400 loops to block 402 to process additional portions of the incoming content. As discussed above, the content may be processed as it is received. In various embodiments, the program-content data stream path and the Timed Text data stream path are synchronized in accordance with the relationship between the program-content data stream and the Timed Text data stream.

Although process 400 is described as providing program content to a display device for display to a user and simultaneously analyzing the Timed Text data for future programs, embodiments are not limited to a user having to watch the program content for the system to detect future programs. In some embodiments, the user may select one or more channels as channels to search for future programs, regardless of whether the user is viewing those channels or not. Separate tuners may be utilized to receive the program-connect data stream from each of these selected channels. Embodiments described herein are employed on each separate Timed Text data stream for corresponding program content for each selected channel. In this way, a list of suggested future recordings can be created while the user is watching another channel or not watching television at all.

The user can then view the list of suggested future programs at block 410 and select which of those future programs to record.

Figure 5:
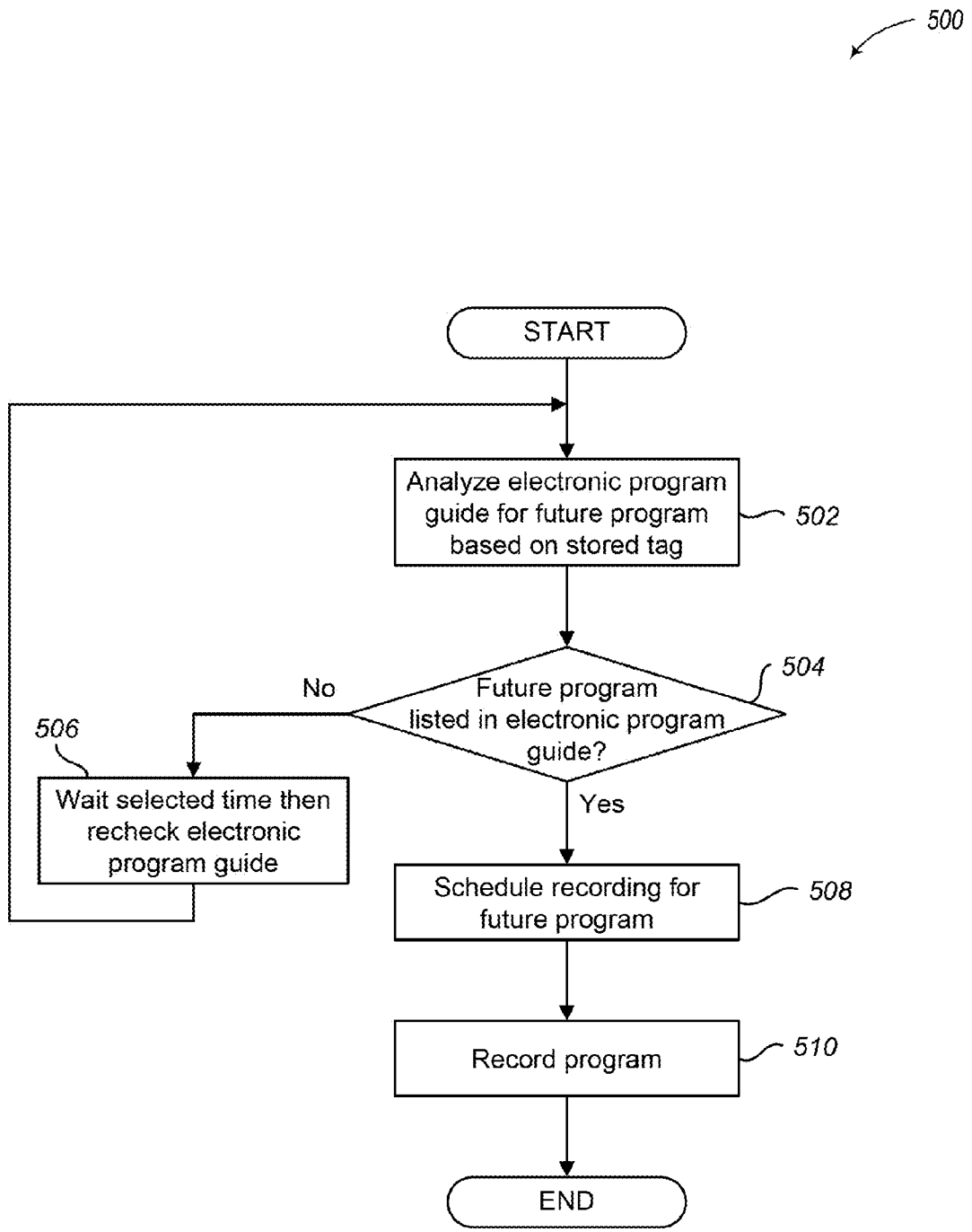
FIG. 5 illustrates a logical flow diagram generally showing one embodiment of a process for scheduling a recording of a future program in accordance with embodiments described herein.

FIG. 5 illustrates a logical flow diagram generally showing one embodiment of a process for scheduling a recording of a future program in accordance with embodiments described herein.

Process 500 begins, after a start block, at block 502, where an electronic program guide is analyzed for the future program based on information stored in a tag for the future program. In various embodiments, a unique identifier, name, time and date, or other identifying information may be used to query the electronic program guide for the future program. As mentioned above, the electronic program guide may be queried when it is updated or at predetermined times.

Process 500 proceeds to decision block 504, where a determination is made whether the future program is listed in the electronic program guide. If the future program is listed in the electronic program guide, then process 500 flows to block 508; otherwise, process 500 flows to block 506.

At block 506, when the future program is not listed in the electronic program guide, process 500 waits to recheck or reanalyze the electronic program guide for the future program at block 502. It should be noted that the television receiver may perform other actions and operations while waiting to recheck the electronic program guide.

If the future program is listed in the electronic program guide, then process 500 flows from decision block 504 to block 508. At block 508, a recording is scheduled for the future program. In at least one embodiment, the future program may be added to a list of programs in the electronic program guide to record. And, at block 510, the program is recorded based on the scheduled recording.

After block 510, process 500 terminates or returns to a calling process to perform other actions.

One or more particular examples in which some of the described embodiments can be used may be helpful. Assume that during the summer, a particular broadcast network wants to advertise the new lineup of shows that it will have starting in the fall, such as in September. During the summer months, when baseball is often watched, the content provider may decide to run advertisements for the fall lineup of shows. For this example, an advertisement is run between innings of a July baseball game announcing a brand new show coming in the fall.

In this instance, the advertisement may describe the new show and indicate that its first episode will be showing in mid-September. It is very possible that the exact timeslot and starting date for the new show are not known. The actual start date may be September 13, September 27, or some other date, which may be fully confirmed and set by the content provider at a later date, such as in August.

The advertisement may have sparked a high interest in the viewer to record the show. But since the viewer does not know when the show will be aired, they are not capable at that time of setting a recording for it. Further, since the show does not air until some known or unknown date in the future, the user may forget the desire to record the show or they may not be present on the day when the first show is finally broadcast, since that time and date may not be known at the time the user sees the advertisement. So as the viewer is watching the advertisement, they want to be sure to get a recording of the program even if they are not available to view the program when it is first broadcast.

Since, at the time of the advertisement, the new show has been fully filmed, stored, and is ready to be communicated over a network or satellite at the proper time, a great number of details about the show can be used as identification information for the future program. For example, the new show may have been already assigned a unique program identifier, a title, a channel, or other identification information. The identification information can be included in the metadata of the advertisement, the Timed Text data stream associated with the advertisement, or other storage location.

As the advertisement is being received by the television receiver, the receiver analyzes the content associated with the advertisement. When the receiver recognizes that the content includes data that identifies specific information about a future program, it can examine that information and store the information or other associated information in a memory. The receiver then can output a signal to be shown on a display device, such as a television, asking the user if they want to record this brand new show when it first shows in September. Alternatively, the receiver sends a message to a remote device of the user, such as the user's smartphone, notifying the user of the new show, or no message is shown to the user at all.

During the advertisement, or for some time thereafter, the user may indicate yes, they would like to set a recording for that future show, even though the time and date of the actual future show are not known. And in fact, in this example, those details cannot be known since the time and date are not yet available. The user indicates that they would like to record the new show that is coming in mid-September, such as by clicking a designated button on their television remote control or through an application executing on their smartphone. Alternatively, the user may set up preferences to indicate automatically that they would like to record certain types of shows such that the user does not have to indicate manually that they would like to record the new show.

When the user selects to record the program, a tag is generated and stored to look for the future program. Even though in this example, the time and date of the show were not obtained from the advertisement, the show's title and channel may be sufficient information to generate the tag to record the program. If the obtained information was not sufficient, the receiver can continuously analyze received content on the same channel as the advertisement or other channels to gather additional information until sufficient information is obtained to generate and store the tag to look for the future program. Going forward, the receiver analyzes the electronic program guide to determine whether or not the tagged future program has been listed on the electronic program guide. Normally, an electronic program guide only has data available or stored in the receiver for approximately the next 14-21 days past the current date. But in this instance, the future show is one that is so far in the future that it is beyond the date of any programs included in the electronic program guide. Accordingly, the receiver does not have any details stored in the current electronic program guide for the new show, and it is not possible for the receiver to set a solid recording date at that time.

From time to time, the receiver will receive or download an updated electronic program guide from the content distributor. The receiver may download the next day or next week of programs as listed in the electronic program guide in order to update the electronic program guide. This download may happen once a day, once every few days, or in some situations, once a week. Since this may be a data-intensive download, with detailed information of many programs, it usually occurs in the middle of the night, such as 2:00 a.m.

As the electronic program guide is updated, the receiver can examine the electronic program guide to determine whether or not any of the tags it currently has stored have programs that are in the electronic program guide. The examining of the electronic program guide can occur immediately after being updated or periodically, such as once every day or once every three or four days. Furthermore, the examining of the electronic program guide can occur offline and at a different time than when the receiver is actually displaying content on the display device for the user. For example, each night at a time when the user is likely not watching the display, such as 3:00 a.m., the receiver can analyze the electronic program guide to determine whether or not the future program has become listed. Similarly, the receiver can analyze the electronic program guide at any time during the day when the system resources are otherwise not in use or there are sufficient available resources to analyze the electronic program guide.

Once the future program is listed in the electronic program guide, a typical program recording is set, and the receiver records the future program when it is received. In this example, since the exact day and time of the new show were unknown when the advertisement was aired, the receiver will still schedule the recording of the program when it is added to the electronic program guide. This is because the receiver can use the tag identifying information obtained from the advertisement, such as the unique program identifier, to locate the show in the electronic program guide. If the day, time, and channel of the future program are known from the advertisement, then the recording may be set at any time or when the electronic program guide includes a listing for that day and time, regardless of whether the electronic program guide specifically lists the program. In this way, the receiver will still record the program even if an updated electronic program is unavailable.

The example just provided is one in which an advertisement is displayed for a particular show, such as a fall show being advertised in mid-July during a popular program. In other situations, the program content itself may contain information about a future program. For example, in October a series, such as a late night talk show, a host may talk about having a Christmas special that is to be shown in the coming weeks. This discussion is within the audiovisual content itself and is part of the received program content, not a separate advertisement. The program content may contain metadata, time-text data stream, or other indication that the current program is announcing a particular special program, such as the Christmas special. The system, following embodiments described herein, may generate a tag and carry out the recording based on user preferences or by generating a notice to the user and receiving indication from the user of a desire to record the new show. Alternatively, if the user does not indicate an interest in recording the new show, it need not generate the tag nor store the tag. It should be noted that the programming content can be continuously analyzed for future programs.

Figure 6:
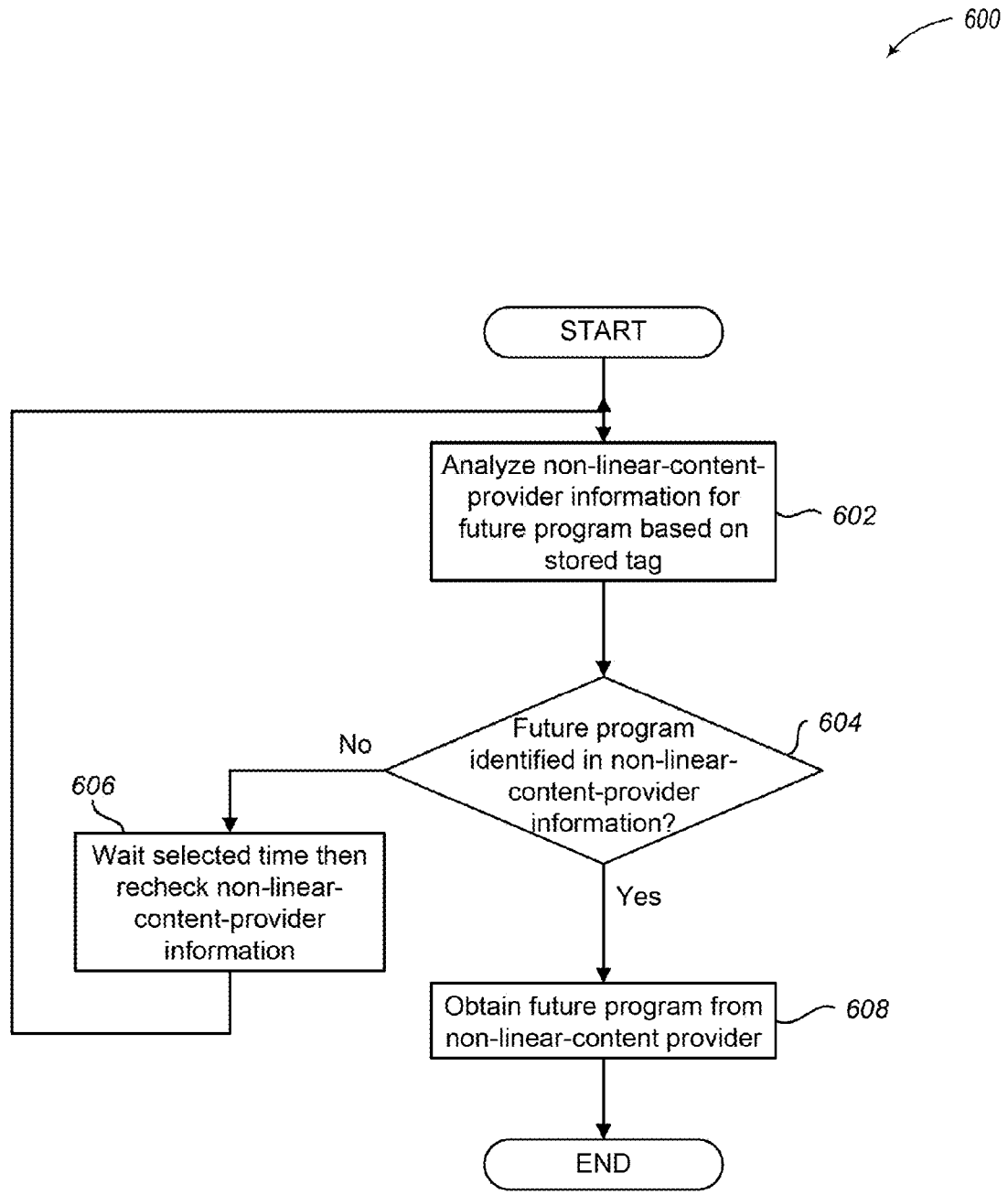
FIG. 6 illustrates a logical flow diagram generally showing one embodiment of a process for obtaining a future program from a non-linear content provider in accordance with embodiments described herein.

FIG. 6 illustrates a logical flow diagram generally showing one embodiment of a process for obtaining a future program from a non-linear content provider in accordance with embodiments described herein.

Process 600 begins, after a start block, at block 602, where non-linear-content-provider information is analyzed for the future program based on information stored in a tag for the future program. The non-linear-content-provider information may include, but is not limited to, video-on-demand libraries, pay-per-view listings, a directory for a website associated with a future program, or other content information from other content providers.

In some embodiments, the information stored in the future program tag identifies a particular non-linear-content provider from which to analyze their information for the future program. For example, assume a commercial advertises a new video that is currently available on-demand or will be soon available on-demand. The system can detect this future program by employing embodiments described herein, such as with process 400 of FIG. 4, and generate a tag that identifies the future program and the non-linear-content-provider that is providing the future program.

In various embodiments, a unique identifier, name, time and date, or other identifying information may be used to query the non-linear-content-provider information for the future program. The non-linear-content-provider information may be queried automatically when the tag is generated, at predetermined times, or when the non-linear-content-provider information is updated.

Process 600 proceeds to decision block 604, where a determination is made whether the future program is listed in the non-linear-content-provider information. If the future program is listed in the non-linear-content-provider information, then process 600 flows to block 608; otherwise, process 600 flows to block 606.

At block 606, when the future program is not listed in the non-linear-content-provider information, process 600 waits to recheck or reanalyze the non-linear-content-provider information for the future program at block 602. It should be noted that the television receiver may perform other actions and operations while waiting to recheck the non-linear-content-provider information.

If the future program is listed in the non-linear-content-provider information, then process 600 flows from decision block 604 to block 608. At block 608, the future program is obtained from the non-linear-content provider. In some embodiments, a recording is scheduled for the future program, and the future program is recorded when it is available from the non-linear-content provider. In other embodiments, the future program may already be available from the non-linear-content provider, and the television receiver requests the future program from the provider.

After block 608, process 600 terminates or returns to a calling process to perform other actions.

The operation of certain aspects will now be described with respect to FIG. 7. In at least one of various embodiments, process 700 may be implemented by or executed on one or more computing devices, such as content distributor 102 in FIG. 1.

Figure 7:
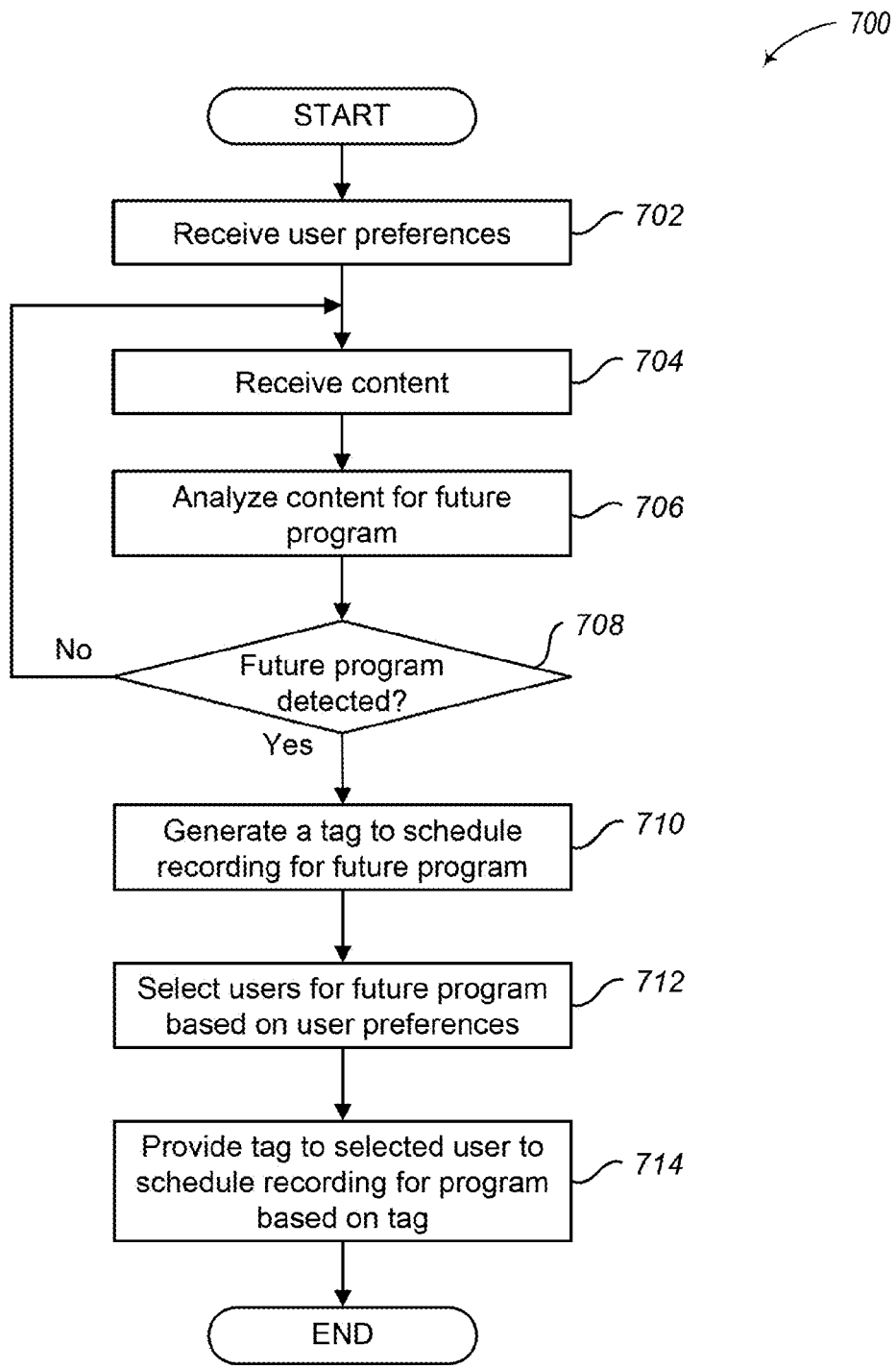
FIG. 7 illustrates a logical flow diagram generally showing an alternative embodiment of a process for analyzing content to detect a future program in accordance with embodiments described herein.

FIG. 7 illustrates a logical flow diagram generally showing an alternative embodiment of a process for analyzing content to detect a future program in accordance with embodiments described herein. Process 700 begins, after a start block, at block 702, where user preferences are received by a content distributor for a plurality of different users. For example, the user may utilize an application on their remote device 108 to indicate content categories, actors, sports, or other preferences for content they enjoy watching. The content distributor may also employ various predicative algorithms and analytics to determine the preferences of the user based on demographic information of the user, viewing history of the user, or other user-related viewing information.

Process 700 proceeds to block 704, where content is received by a content distributor 102. As mentioned above, the content may include program content, Timed Text data, metadata inserted in the program content, closed-captioning data, etc., which may come from a plurality of content providers 104 or a plurality of information providers 106, or both. In various embodiments, the content from a plurality of different channels is simultaneously received and analyzed by the content distributor.

Other embodiments described herein utilize a television receiver to receive and analyze the content, rather than the content distributor. But the television receiver may be limited in the number of different channels that it can receive and analyze. In some instances, the television receiver can only monitor the same number of channels as it has tuners. As described above, the user may select which channels to monitor. But if there is a future program mentioned in the content of another channel that is not being monitored, then the future program will go undetected, and the user may miss out on being notified of the future program or scheduling a recording for that program.

Since the content distributor is not limited to a small number of tuners, it can dedicate numerous computing resources to monitor the content of each of a plurality of channels that it distributes to its users.

Process 700 proceeds to block 706, where the content is analyzed for future programs. In various embodiments, block 706 employs embodiments of block 304 of FIG. 3 to analyze the received content. The content from each of a plurality of channels is analyzed for identifying information of future programs.

Process 700 continues at decision block 708, where a determination is made whether a future program is detected in the analyzed content. In various embodiments, decision block 708 may employ embodiments of decision block 306 of FIG. 3 to determine if a future program is detected, such as when sufficient identifying information is obtained or extracted from the content. In some embodiments, the content distributor stores any partial, non-sufficient future program information for some timeframe to try and acquire additional information about the future program. In such an embodiment, process 700 may continuously receive additional content and analyze the additional content for additional information for that future program, which when combined with the previously obtained partial information is sufficient to identify the future program. If a future program is detected, process 700 flows to block 710; otherwise, process 700 loops to block 704 to continue to receive additional content.

At block 710, a tag or other data structure is generated to schedule a recording for the detected future program. In various embodiments, block 710 may employ embodiments of block 308 of FIG. 3 to generate a tag for the future program, but where the content distributor is generating the tag, rather than the television receiver.

Process 700 proceeds next to block 712, where one or more users are selected from a plurality of users based on each user's preferences. For example, if a user's preferences indicate that they would like to record James Bond movies and the content distributor detects an upcoming James Bond marathon at block 708, then that user is selected. But other users whose preferences indicate that they are uninterested in James Bond are not selected. A variety of different matching techniques may be utilized to compare one or more attributes of the future program, such as content category, theme, characters, actors, channel, etc., with each users' preferences.

Process 700 continues at block 714, where the content distributor provides the tag to the selected users so that the corresponding television receivers of the selected users can store the tag and schedule a recording for the future program based on the tag, such as described above in conjunction with block 310 of FIG. 3 and elsewhere herein.

In some embodiments, the tag may be provided directly to the television receiver so that the television receiver stores and uses the tag to schedule a recording of the future program, as described herein. In some embodiments, the user may be notified that the television receiver has received a tag for a future program. The user may view the notification via the display device 124 that is connected to the television receiver. The user may utilize a remote control to provide an indication to the television receiver whether the television receiver should maintain the tag and record the future program, or delete the tag and not record the future program.

In other embodiments, a notification with the tag may be provided to a mobile device of the user, such as remote device 108. In some embodiments, the mobile device may display notifications for one or a plurality of detected future programs to the user. For example, the user may utilize an application executing on the mobile device to view future programs detected by the content distributor. The application may display notifications for one or a plurality of future programs for a predetermined amount of time or until the user deletes the notifications. The user can click on a button in the application, and the mobile device sends, e.g., via Bluetooth or some other suitable communication network, a message along with the tag to the television receiver of the user. The television receiver stores and uses the tag to schedule a recording of the future program, as described herein.

In some embodiments, the content distributor may store a list of possible future programs for each separate user before providing the tags or notifications to each user. In this way, a user may receive a single notification each day with tags for multiple future programs, rather than multiple different notifications throughout the day. Similarly, the content distributor may remove redundant future programs from the list before providing the tags to the user. Future programs may be redundant if it is detected multiple times before the tag is provided to the user, or a tag for the same future program was previously sent to the user. In some embodiments, a tag may be resent to the user to update a currently stored tag on the television receiver, such as if additional programing information or identification information becomes available through additional detections of the future program.

After block 714, process 700 terminates or returns to a calling process to perform other actions.

As described elsewhere herein, each corresponding television receiver utilizes the tags it receives, just as if the television receiver detected the future program rather than the content distributor, to schedule a recording for the future program, query other content delivery mechanisms to determine if the future program is currently available or will become available, or provide a reminder notification of the future program to the user on display device 124 or remote device 108.

Figure 8:
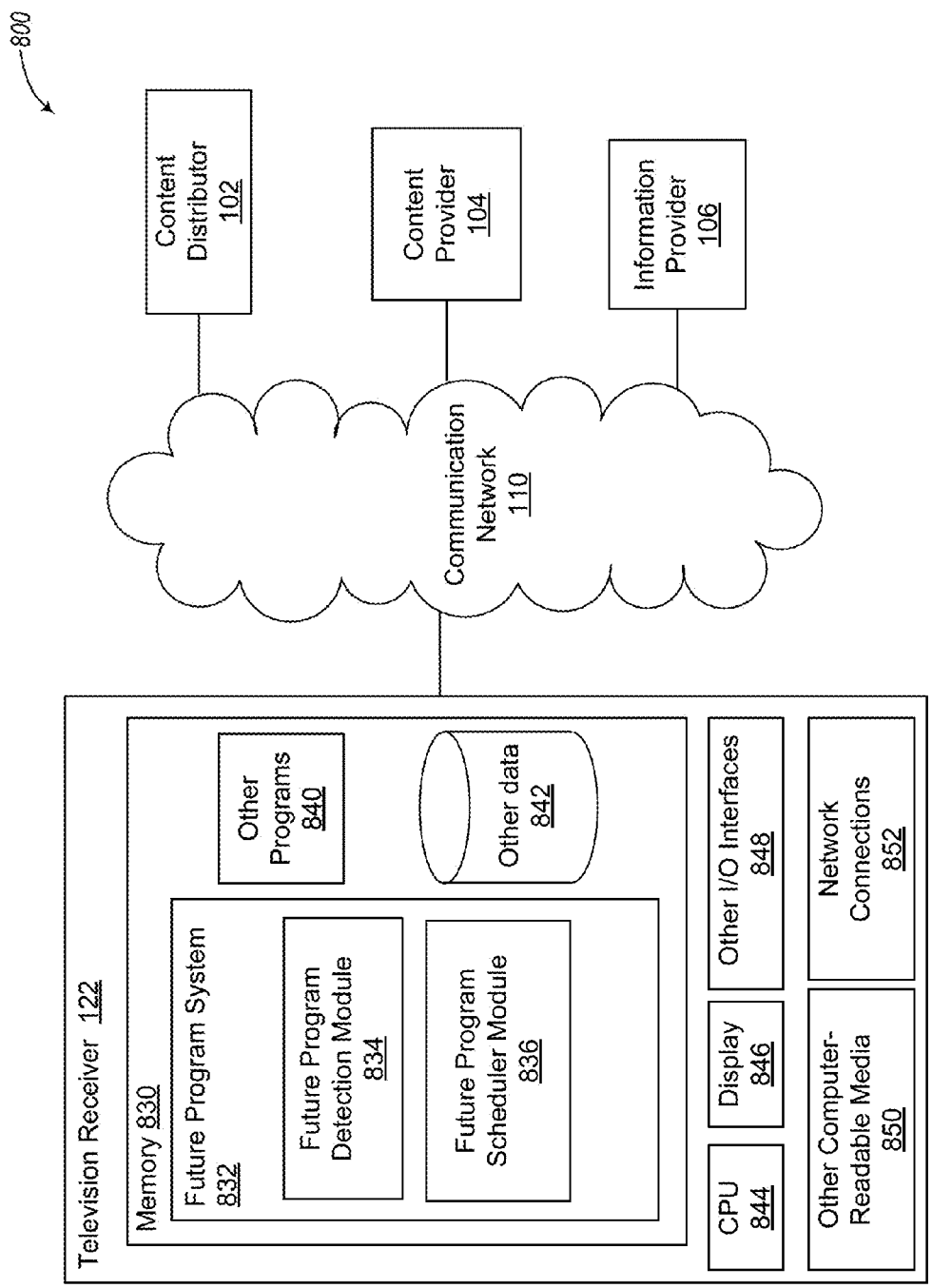
FIG. 8 shows a system diagram that describes one implementation of computing systems for implementing embodiments described herein.

FIG. 8 shows a system diagram that describes one implementation of computing systems for implementing embodiments described herein. System 800 includes television receiver 122, content distributor 102, content provider 104, and information provider 106.

Television receiver 122 receives content from content distributor 102 and analyzes the content to detect future programs based on information associated with the content and to schedule a recording for the future program, as described herein. One or more general-purpose or special-purpose computing systems may be used to implement television receiver 122. Accordingly, various embodiments described herein may be implemented in software, hardware, firmware, or in some combination thereof. Television receiver 122 may include memory 830, one or more central processing units (CPUs) 844, display interface 846, other I/O interfaces 848, other computer-readable media 850, and network connections 852.

Memory 830 may include one or more various types of non-volatile and/or volatile storage technologies. Examples of memory 830 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 830 may be utilized to store information, including computer-readable instructions that are utilized by CPU 844 to perform actions, including embodiments described herein.

Memory 830 may have stored thereon future program system 832, which includes future program detection module 834 and future program scheduler module 836. The future program detection module 834 may employ embodiments described herein to analyze content, such as the Timed Text data associated with a program-content data, to detect future programs. As described herein, a future program may be detected by extracting information from the content, such as the Timed Text data, which identifies a future program or when and what channel to record. Once a future program is detected, the future program detection module 834 generates a tag for the future program. The tag may be stored in other data 842 or other some other memory. The future program scheduler module 836 may utilize the stored tag to periodically monitor an electronic program guide for a listing of the future program and record the program at the appropriate time and channel. In some embodiments, the future program scheduler module 836, rather than the future program detection module 834, may generate and store the tag for the detected future program. Memory 830 may also store other programs 840 and other data 842. For example, other data 842 may include a DVR or other recording device for storing recorded content or recorded informational banners.

Display interface 846 is configured to provide content to a display device, such as display device 124 in FIG. 1. Network connections 852 are configured to communicate with other computing devices, such as content distributor 102, via communication network 110. Other I/O interfaces 848 may include a keyboard, audio interfaces, other video interfaces, or the like. Other computer-readable media 850 may include other types of stationary or removable computer-readable media, such as removable flash drives, external hard drives, or the like.

Content distributor 102, content provider 104, information provider 106, and television receiver 122 may communicate via communication network 110.

In some embodiments, content distributor 102 includes one or more server computer devices to detect future program and provide tags for the future programs to corresponding television receivers 122. These server computer devices include processors, memory, network connections, and other computing components that enable the server computer devices to perform actions as described herein.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
    receiving, at a television receiver for a first channel, a first data stream having first program content that is encapsulated with metadata;
    receiving, at the television receiver for the first channel, a distinct second data stream having Timed Text data;
    receiving, at the television receiver for a second channel, a third data stream having second program content;
    providing the second program content to a display device for presentation to a user;
    analyzing, as the second program content is being received and provided to the display device, the Timed Text data in the second data stream for future audiovisual programs that are to be received at the television receiver on a future date, the future date being on a date that is beyond a most future date for any program then listed in an electronic program guide in the television receiver;
    detecting identification data for a future program to be received on the future date from the analysis of the Timed Text data in the second data stream;
    generating, and storing on the television receiver, a tag that includes an identifier for the future program based on the identification data;
    receiving updated information for the electronic program guide that contains listings of new audiovisual programs;
    periodically analyzing the electronic program guide for a listing of the future program based on the stored tag; and
    in response to the future program being listed in the electronic program guide, scheduling a recording to be made of the future program.

2. The method of claim 1, further comprising:
    before the generating and storing of the tag for the future program:
        storing the identification data for a predetermined period of time;
        receiving a signal from a remote control with an indication to schedule the recording of the future program;
        generating and storing the tag when the signal is received within the predetermined period of time; and
        disregarding the identification data for that particular future program when the signal is not received within the predetermined period of time.

3. The method of claim 1, wherein generating the tag, further comprises:
    automatically generating the tag when the identification data is detected without input from a user.

4. The method of claim 1, further comprising:
    before the generating and the storing of the tag:

providing, to a mobile device, a notification that identifies the future program to a user; and receiving a response from the mobile device with a user selection to schedule the recording of the future program.

5. The method of claim 4, wherein the response from the mobile device includes at least one user provided modification to at least one recording parameter for the television receiver to record the future program.

6. The method of claim 1, further comprising:
before the generating and the storing of the tag:
providing a notification to the user on the display device that is also displaying the second program content rendered from the third data stream; and
receiving a signal from a remote control with an indication to schedule the recording of the future program.

7. The method of claim 1 wherein the second data stream is a Timed Text data stream that is separate from the first data stream that includes the first program content.

8. The method of claim 1, wherein the identification data is the date, time, and channel indicating when the future program will be broadcast.

9. The method of claim 1, wherein the analyzing of the Timed Text data in the second stream for future programs occurs throughout receipt of the second program content in the third data stream.

10. The method of claim 1, wherein the detecting of the future program is based on at least one user preference that defines at least one characteristic of the future program.

11. The method of claim 1, further comprising:
determining at least one other program that is similar to the future program and scheduling a recording for other program.

12. The method of claim 11, wherein the future program and the at least one other program are in a same category of content.

13. A receiver, comprising:
a first tuner that receives first program content, Timed Text data, and first metadata, the first Timed Text data being different than the first metadata, the first program content is for display to a user and the Timed Text data is not to be displayed to the user;
a second tuner that receives second program content, second Timed Text data, and second metadata, the second Timed Text data being different than the second metadata;
an output that provides the first program content to a display device;
a memory that stores at least instructions; and
a processor that executes the instructions to:
provide the first program content to the output for display to the user;
analyze, as the first program content is being received by the first tuner and provided to the display device, the first Timed Text data from the first tuner and the second Timed Text data from the second tuner for future audiovisual programs;
detect a plurality of future programs from the analysis of the first Timed Text data and the second Timed Text data, the plurality of future programs being detected when the first Timed Text data or the second Timed Text data includes identifying information for the plurality of future programs;
generate, and store in the memory, a respective tag that includes a respective identifier for each of the plurality of future programs based on the identifying information;
provide a list of the plurality of future programs to a mobile device of the user;
receive a response from the mobile device with a programming modification provided by the user to at least one future program of the plurality of future programs;
store the programming modification in the respective tag for the at least one future program; and
utilize the respective tag with the programming modification for the at least one future program to set a recording for the at least one future program when received by the first tuner.

14. The receiver of claim 13, wherein the processor executes further instructions to:
automatically search an electronic program guide at predetermined times for the plurality of future programs utilizing the respective identifiers included in the respective tags; and
schedule the recording for the plurality of future programs when the plurality of future programs is listed in the electronic program guide based on the programming modifications provided by the user.

15. The receiver of claim 13, wherein the processor executes further instructions to:
temporarily store the identifying information; and
in response to receiving an input from a user to record the at least one future program, generate and store the respective tag.

16. The receiver of claim 13, wherein the processor executes further instructions to:
store the identifying information for a predetermined period of time;
if a record signal is received from a remote control within the predetermined period of time to record a respective future program, generate and store the respective tag; and
if the record signal is not received within the predetermined period of time, disregard the plurality of future programs and continue to analyze the Timed Text data for other future programs.

17. The receiver of claim 13, wherein the Timed Text data is scraped for the identifying information.

* * * * *